United States Patent [19]

Ohmi et al.

[11] Patent Number: 4,827,879
[45] Date of Patent: May 9, 1989

[54] MANIFOLD ATTACHMENT

[75] Inventors: Masatoshi Ohmi, Iwata; Kazuo Uchiyama; Toshihiko Yoneda, both of Shizuoka, all of Japan

[73] Assignee: Yamaha Hatsudoki Kabushiki Kaisha, Itawa, Japan

[21] Appl. No.: 917,400

[22] Filed: Oct. 10, 1986

[30] Foreign Application Priority Data

Oct. 11, 1985 [JP] Japan .................... 60-226284

[51] Int. Cl.$^4$ .................................. F02M 35/00
[52] U.S. Cl. ......................................... 123/52 MV
[58] Field of Search ........ 123/52 M, 52 MV, 52 MC, 123/1, 432, 308

[56] References Cited

U.S. PATENT DOCUMENTS

| 2,845,911 | 8/1958 | Gill | 123/52 MV |
| 2,845,912 | 8/1958 | Bird | 123/52 MV |
| 2,916,027 | 12/1959 | Chayne et al. | 123/52 MV |
| 4,538,574 | 9/1985 | Lombardi | 123/432 |
| 4,649,876 | 3/1987 | Ohmi et al. | 123/302 |
| 4,669,428 | 6/1987 | Ichida et al. | 123/52 MB |

OTHER PUBLICATIONS

Detroit Diesel Engine Service Manual.

Primary Examiner—Willis R. Wolfe, Jr.
Assistant Examiner—M. Macy
Attorney, Agent, or Firm—Ernest A. Beutler

[57] ABSTRACT

A V type engine embodying an improved compound manifolding system wherein the manifolding system mates with a horizontally extending surface of each cylinder head with the cylinder heads horizontally extending surfaces lying in the same plane for each of attachment, assembly and fit.

12 Claims, 3 Drawing Sheets

MANIFOLD ATTACHMENT

BACKGROUND OF THE INVENTION

This invention relates to a manifold attachment for an internal combustion engine and more particularly to an improved cylider head, intake passage and intake manifold assembly for an internal combustion engine.

As is well known, most four-cycle internal combustion engines include a cylinder head which, in part, forms the combustion chambers and through which intake passages extend. An intake manifold is attached to the cylinder head which forms a continuation of the intake passages and an air inlet for them. With such an arrangement, it is desirable that the attachment of the intake manifold to the cylinder head be such that it permits ease of attachment and yet will insure good sealing, particularly when the manifold has a plurality of runners and the cylinder head has a plurality of intake ports with which the runners cooperate. In many instances, the engine is disposed so that the cylinder head is inclined at an angle to the vertical. Typically, a V type engine has such orientation although slant-type inline engines have the same type of arrangement. With the previously proposed engines of this type, the intake manifold attachment to the cylinder head has not offered the ease of assembly and the insurance of good sealing as would be desirable.

It is, therefore, a principal object of this invention to provide an improved cylinder head and intake manifold assembly for an internal combustion engine.

It is another object of this invention to provide an improved cylinder head and intake manifold assembly wherein the cylinder head is disposed at an angle to the vertical and the manifold may be conveniently and easily attached.

Recently, there have been proposed arrangements wherein each combustion chamber of the engine is supplied by a pair of cylinder head intake passages and intake ports and different length manifolds serve each of the intake passages. In this way, the engine may have its induction system tuned so as to provide optimum running conditions under a plurality of engine load and speed settings. However, where such compound intake manifolding is employed, the problem of attaching the intake manifold to the cylinder head is particularly aggravated. This is particularly true where the pairs of runners of the manifold that serve each of the cylinders have substantially different configurations.

It is, therefore, a still further object of this invention to provide an improved manifolding and cylinder head arrangement for an engine having plural intake ports serving each chamber.

It is a further object of this invention to provide an improved compound manifolding system and arrangement for attaching it to an internal combustion engine.

In connection with engines having inclined cylinder heads and particularly those of the type wherein the cylinder heads are associated with cylinder banks disposed at a V to each other, it has been the practice to have the intake manifold have inclined surfaces that mate with corresponding inclined surfaces of the respective cylinders heads. Because of production variations and because of the angular relationship of the mating surfaces, it has been difficult to insure good sealing and good fit with the previously proposed arrangements. In addition, some forms of manifold attachment result in the intake manifold acting as a wedge on the cylinder banks which can cause obvious difficulties including sealing problems.

It is, therefore, a still further object of this invention to provide an improved manifolding system for a V type engine.

It is a further object of this invention to provide a manifolding system for a V type engine wherein the sealing faces of the intake manifold and the respective sealing surfaces of the cylinder heads lie in a common plane.

SUMMARY OF THE INVENTION

A first feature of this invention is adapted to be embodied in an internal combustion engine having a cylinder head forming a combustion chamber. At least one intake port extends from the combustion chamber through the cylinder head and terminates in a horizontally extending surface of the cylinder head. An intake manifold is provided that has an inlet and an outlet which outlet is surrounded by a flange. Means are provided for affixing the flange of the intake manifold to the cylinder head horizontally extending surface with the manifold outlet being aligned with and communicating with the intake port.

Another feature of this invention is adapted to be embodied in an internal combustion engine having a cylinder head that defines a combustion chamber. First and second intake passages are formed in the cylinder head and serve the same combustion chamber. The first and second intake passages have inlet ends formed in a common external face of the cylinder head. A first intake manifold runner has a first manifold passage and a second intake manifold runner has a second manifold passage. The first and second manifold passages are differently configured and terminate in outlets that are formed in a common flange. Means are provided for affixing the manifold common flange to the common cylinder head external face with the first and second manifold passages communicating respectively with the cylinder head first and second intake passages.

Yet another feature of the invention is adapted to be embodied in an internal combustion engine having a pair of angularly related cylinder banks. A first cylinder head is fixed to the first cylinder bank and forms at least one combustion chamber. In a like manner, a second cylinder head is affixed to the other of the cylinder banks and it forms at least one combustion chamber. A first intake passage is formed in the first cylinder head and extends from the combustion chamber to an inlet in an external surface of the first cylinder head. Similarly, a second intake passage is formed in the second cylinder head and extends from its combustion chamber to an inlet that is formed in an external surface of the second cylinder head. The external surfaces of the cylinder heads and the intake passage inlets all lie in a common plane. An intake manifold is affixed to the cylinder head external surfaces and has runners serving the cylinder head intake passages.

DETAILED DESCRIPTION OF THE PREFERRED EMBODIMENT

Figure 1:
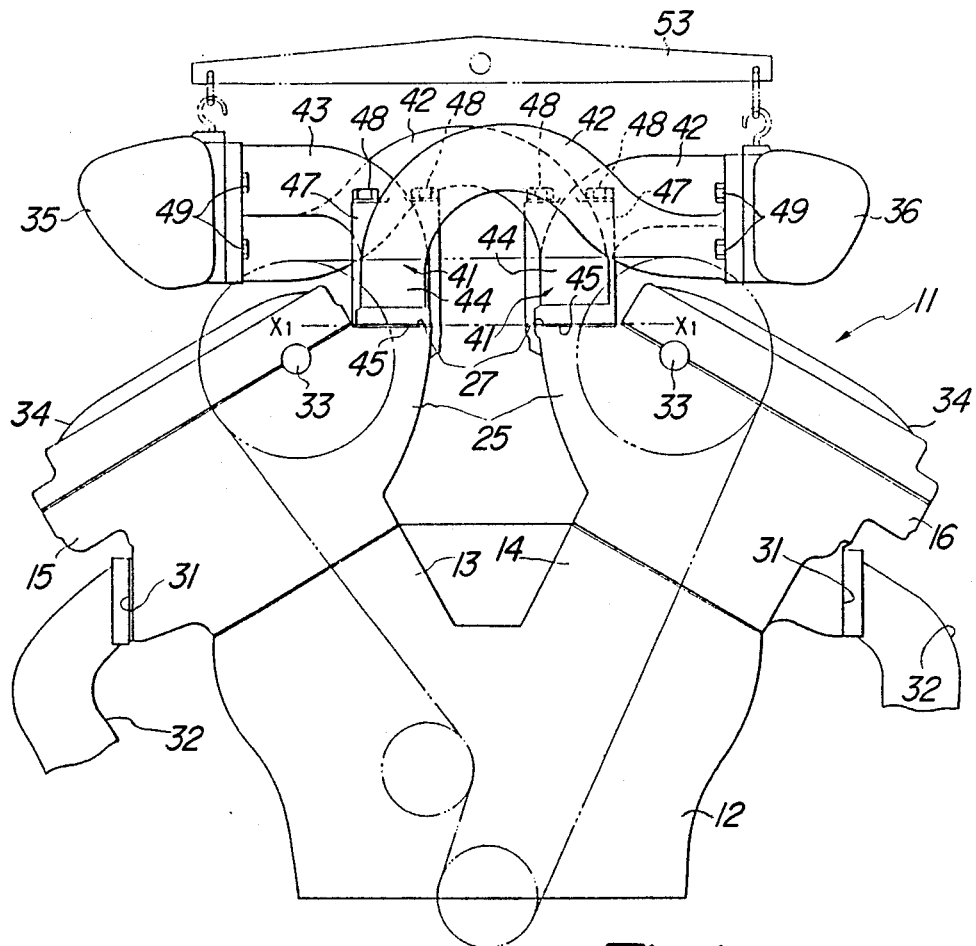
FIG. 1 is a front elevational view of an internal combustion engine constructed in accordance with an embodiment of the invention.

In the drawings, the reference numeral 11 indicates generally an internal combustion engine constructed in accordance with an embodiment of the invention. In the illustrated embodiment, the engine 11 is of the V type, however, it is to be understood that certain facets of the invention may be employed in engines having other cylinder arrangements. However, there are particular advantages in the use of the invention in connection with a V type engine.

The engine 11 includes a cylinder block 12 which has a pair of angularly related cylinder banks 13 and 14. In the illustrated embodiment, the engine 11 is of the V6 type and each cylinder bank 13 and 14 has three cylinders and the cylinder banks 13 and 14 are disposed at a 60 degree angle to each other. It is to be understood, however, that various cylinder numbers and angular spacing between the cylinder blocks may be employed.

Figure 3:
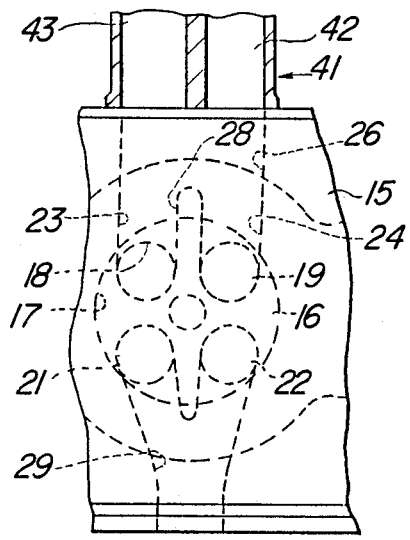
FIG. 3 is a partially schematic cross-sectional view showing one of the combustion chambers of the engine and the manifolding arrangement associated with it.
Figure 2:
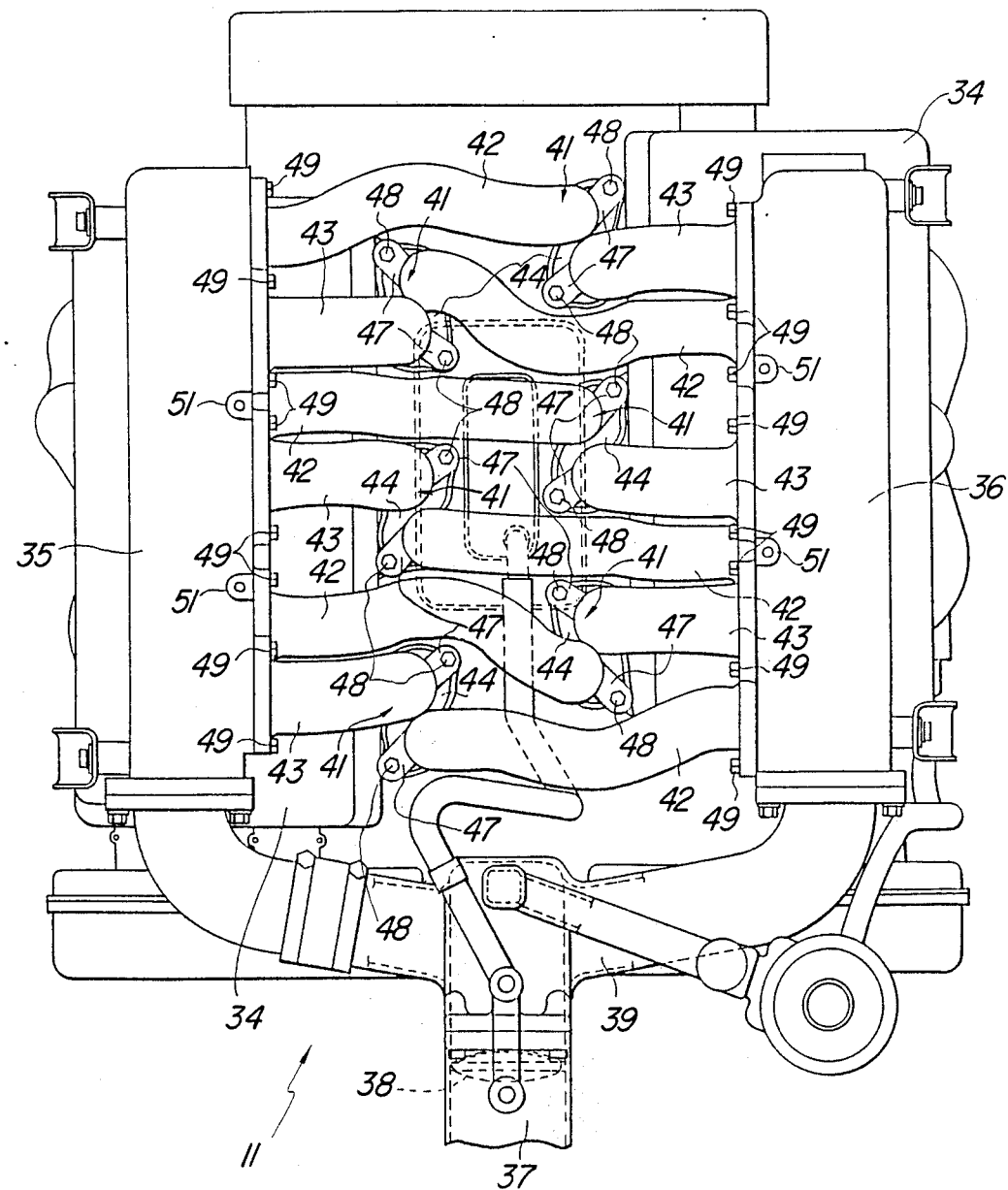
FIG. 2 is a top plan view of the engine.

A respective cylinder head 15 and 16 is affixed in any suitable manner to the cylinder banks 13 and 14 and define a plurality of combustion chambers (three for each bank in the illustrated embodiment) which are shown generally in FIG. 3 wherein the combustion chamber is defined by a recess 16 of the respective cylinder head and a corresponding cylinder bore 17 of the associated cylinder bank. In addition, a piston (not shown) is slidably supported in the cylinder bore 17 and is connected to the output shaft of the engine in a known manner. Since the invention is directed to the intake manifolding and its association with the cylinder heads and with the cylinder heads themselves, the internal components of the engine have not been illustrated, except insofar as is necessary to understand the invention.

Each cylinder head combustion chamber recess 16 is provided with a pair of intake ports 18 and 19 and a pair of exhaust ports 21 and 22. Respective intake passages 23 and 24 extend through the cylinder head from its combustion chambers 16 through a projection 25 formed on the inner sides of the cylinder heads 15 and 16 and terminate in a common inlet opening 26 that is formed in a horizontally extending surface 27 of the respective cylinder head. It should be noted that the surfaces 27 of the cylinder heads 15 and 16 lie on a common plane indicated at X1-X1 in FIG. 1. This common plane extends in a horizontal direction, for a reason to be described.

Although the cylinder head intake passages 23 and 24 have the common inlet 26, they are separated from each other adjacent the intake ports 18 and 19 by a wall 28 of the respective cylinder head. The wall 28 terminates short of the surface 27 so that the intake passages 23 and 24 can communicate with each other only in this narrow area, as will be described.

The exhaust ports 21 and 22 are formed at the inner end of a siamesed exhaust passageway 29 that is formed in the cylinder head and which extends from its combustion chamber recess 16 to an outer face 31 to which a respective exhaust manifold 32 is attached. The exhaust manifolds 32 feed an appropriate exhaust system (not shown).

Valves (not shown) are associated with the intake ports 18 and 19 and with the exhaust ports 21 and 22. These valves are operated by means of respective overhead mounted intake and exhaust camshafts. These camshafts are not shown except for their axes of rotation 33. However, it is to be understood that the driving arrangement for the camshafts may be as disclosed in copending application entitled "Valve Driving Means For V Type Engine Of Vehicles", Ser. No. 728,843, filed Apr. 30, 1985 in the names of Kazuo Uchiyama and Takamitsu Suzuki and assigned to the assignee of this application, now U.S. Pat. No. 4,643,143. The disclosure of that application is herein incorporated by reference.

A suitable cam cover 34 is affixed to each of the cylinder heads 15 and 16 in an appropriate manner.

The engine 11 is provided with a compound induction system so that the intake port 18 is served by a relatively short intake passage which may be tuned for good high speed performance and the intake port 19 is supplied with an intake charge from a relatively long intake passage that may be tuned for good low speed performance. Reference may be had to copending application entitled "Intake Means Of Internal Combustion Engine", Ser. No. 634,795, filed July 26, 1984 in the names of Masatoshi Ohmi, Toshihiko Yoneda and Kazuo Uchiyama and assigned to the assignee of this application for a detailed description of such an induction system and the tuning theory associated with it, now U.S. Pat. No. 4,649,876. That disclosure is herein incorporated by reference.

Basically, the induction system includes a first plenum chamber 35 which is juxtaposed to and lies over the cylinder head 15 and extends substantially the full length of this cylinder head and a second plenum chamber 36 which is juxtaposed to and lies over the cylinder head 16 and which extends for substantially its full length. The plenum chambers 35 and 36 have respective inlet openings at their forward end which are served by a common air inlet including an air inlet opening 37 which is supplied with filtered air from an air cleaner (not shown). A throttle valve 38, which is manually controlled by the operator in an appropriate manner, is positioned at the downstream end of the inlet opening 37 and discharges into a "Y" type inlet device 39 that divides the air flow to the plenum chambers 35 and 36 for recharging them.

An intake manifold system is provided for serving the intake ports 18 and 19 from the plenum chambers 35 and 36 in the manner as described in copending application Ser. No. 634,795, now U.S. Pat. No. 4,649,876. This intake manifold system includes a plurality of individual intake manifold sections, each indicated generally by the reference numeral 41. Each manifold section 41 is comprised of a long runner 42 that serves the cylinder head intake port 19 and which is tuned, as aforenoted, for slow speed running and a relatively short runner 43 that serves the cylinder head intake port 18 and which is tuned for high speed running condition. The runners 42 and 43 have their separate outlet ends terminating in a common flange 44 which has a lower face 45 that mates with the respective cylinder head surface 27 and there may be a gasket interposed therebetween. The flange sections 44 also have upstanding bosses 47 that pass attachment bolts 48 for affixing the individual manifold sections 41 to the respective cylinder head 15 or 16.

The manifolds are arranged with each plenum chamber 35 and 36 so that the short intake runner 43 extends from the plenum chamber 35 to the intake port 18 of the cylinder head 16 while the corresponding short runner 43 associated with the plenum chamber 36 runs to the intake port 18 of the cylinder head 16. The long intake ports 42 run to the intake ports 19 of the opposite cylinder heads. In this way, it is insured that there will be the desired effective lengths. Each runner is formed with a flange at its outer end, which flanges are affixed as by bolts 49 to the respective plenum chambers 36 or 35. It will be noted that the intake passages serving the intake ports 18 and 19 do not communicate with each other except in the area where the cylinder head intake passages 23 and 24 merge with their common opening 26. This restricted communication has been found to significantly improve mid-range torque.

Figure 4:
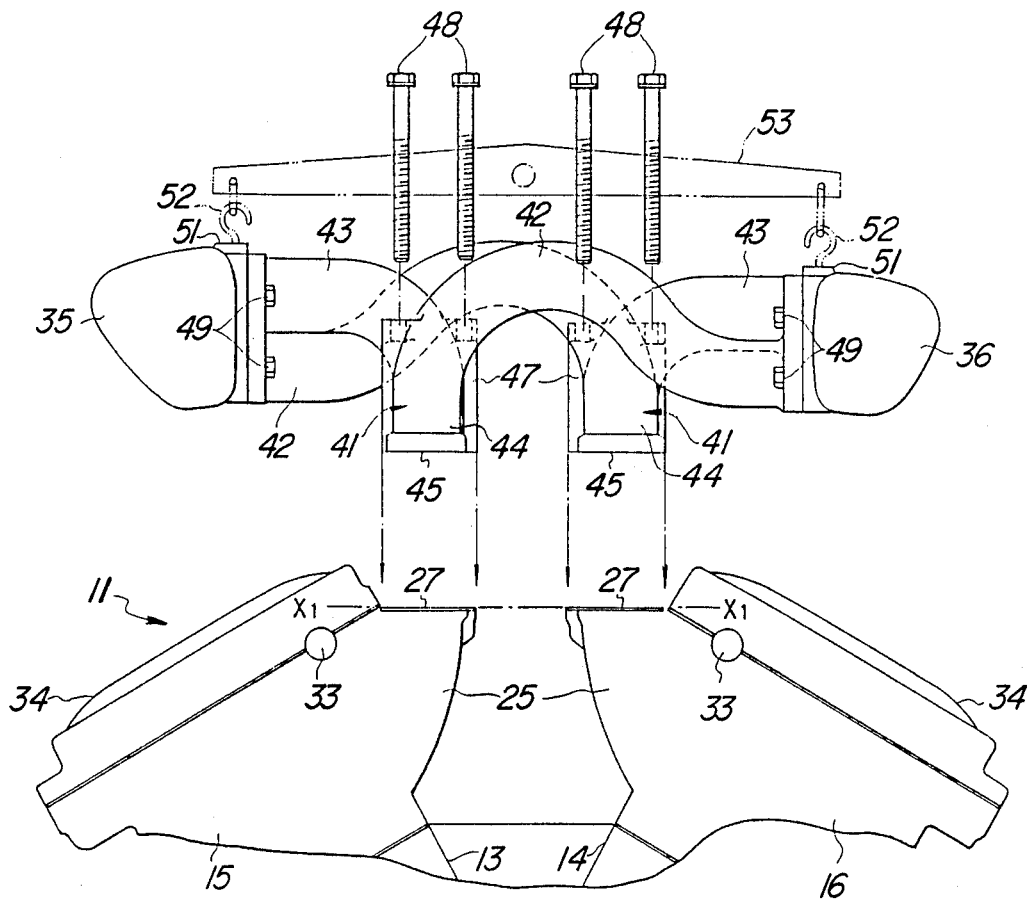
FIG. 4 is a partial front elevational view showing the manner in which the intake manifold assembly is attached.

When the individual manifold sections 41 are bolted to their respective plenum chambers 35 and 36, the plenum chambers 35 and 36 and manifold sections 41 form a rigid intake manifold subassembly as shown in FIG. 4. The lower surfaces 45 of the flanges 44 may be easily assembled onto the cylinder heads 15 and 16 with this assembly as a unit as shown in FIG. 4. For this purpose, each plenum chamber 35 and 36 is formed with a pair of spaced lifting lugs 51 that is adapted to receive lifting eyebolts 52 that can be attached to an appropriate lifting jig 53 for assembly line installation of the induction system to the remaining block of the completed engine. In this way, assembly and disassembly is readily facilitated and as may be readily apparent, a very simple gasketing arrangement and bolting arrangement may be employed. Thus, the device permits ease of assembly, good sealing and does not add strains to the cylinder blocks assembly through the use of inclined wedging surfaces.

Although an embodiment of the invention has been illustrated and described, it should be readily apparent that various changes and modifications may be made without departing from the spirit and scope of the invention, as defined by the appended claims.

We claim:

1. In an internal combustion engine having a pair of angularly related cylinder banks, a first cylinder head fixed to a first of said cylinder banks and forming at least one combustion chamber therewith, a second cylinder head affixed to the other of said cylinder banks and forming at least one combustion chamber therewith, a first intake passage formed in said first cylinder head and extending from said combustion chamber to an inlet in an external face of said first cylinder head, a second intake passage formed in said second cylinder head and extending from its combustion chamber to an inlet formed in an external surface of said second cylinder head, said external surfaces of said cylinder heads and the intake passages both lying in the same common plane, and an intake manifold affixed to said cylinder head external surfaces and having runners serving said cylinder head intake passages, each of said runners terminating in a respective flange lying over the respective of said cylinder head external surfaces, and transversely spaced threaded fastening means extending perpendicular to said cylindrical head external surfaces for affixing said cylintrical head external surfaces for affixing said intake manifold to said cylinder heads.

2. An internal combustion engine as set forth in claim 1 wherein each cylinder head is formed with a plurality of combustion chambers having intake passages and the intake manifold is formed with a plurality of runners each having a flange affixed to the respective cylinder head horizontally extending surface.

3. An internal combustion engine as set forth in claim 2 further including a plenum chamber to which said runners are each affixed so as to form a complete unit consisting of the plenum chamber and the runners.

4. An internal combustion engine as set forth in claim 3 further including a pair of spaced lifting lugs formed on the plenum chamber for facilitating attachment of the intake manifold to the cylinder head.

5. An internal combustion engine as set forth in claim 1 wherein cylinder head has a pair of intake passages serving each chamber and the pair of intake passages terminate in the external surface and wherein the intake manifold comprises a manifold section having a first runner serving the first of the cylinder head intake passages and a second runner serving the other of the cylinder head intake passages, said runners being surrounded by a common flange that is affixed to the respective cylinder head surface.

6. An internal combustion engine as set forth in claim 5 wherein the cylinder head is formed with a plurality of combustion chambers having intake passages and the intake manifold is formed with a plurality of sections each containing first and second runners and each having a flange affixed to the respective cylinder head external surface.

7. An internal combustion engine as set forth in claim 6 further including a pair of plenum chambers to which said runners are each affixed so as to form a complete unit consisting of the plenum chambers and the runners.

8. An internal combustion engine as set forth in claim 7 further including a pair of spaced lifting lugs formed on the plenum chamber for facilitating attachment of the intake manifold to the cylinder head.

9. In an internal combustion engine as set forth in claim 1 wherein each cylinder bank has multiple cylinders each having intake passages terminating in external surfaces of the cylinder head that lie in the common plane.

10. In an internal combustion engine as set forth in claim 9 wherein each cylinder head intake passage has a separate outlet opening to the respective combustion chamber through a separate intake port.

11. In an internal combustion engine as set forth in claim 10 wherein there is a first plenum chamber juxtaposed to the first of the cylinder heads and a second plenum chamber juxtaposed to the second of the cylinder heads, said intake manifold having a first runner extending from said plenum chamber to an intake passage of the adjacent cylinder head and another runner extending from the plenum chamber to the other cylinder head.

12. In an internal combustion engine as set forth in claim 11 wherein the runners and plenum chambers are all affixed to each other as a common unit and have lifting lugs for facilitating insertion as such a common unit to the engine carrying the cylinder heads.

* * * * *